United States Patent
Jain et al.

(10) Patent No.: US 11,727,104 B2
(45) Date of Patent: *Aug. 15, 2023

(54) INCORPORATING RISK-BASED DECISION IN STANDARD AUTHENTICATION AND AUTHORIZATION SYSTEMS

(71) Applicant: Aetna Inc., Hartford, CT (US)

(72) Inventors: Salil Kumar Jain, Jackson Heights, NY (US); Abbie Barbir, Ogdensburg, NY (US); Derek Swift, Lake George, NY (US)

(73) Assignee: Aetna Inc., Hartford, CT (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/952,638

(22) Filed: Nov. 19, 2020

(65) Prior Publication Data
US 2021/0103650 A1    Apr. 8, 2021

Related U.S. Application Data

(63) Continuation of application No. 15/654,096, filed on Jul. 19, 2017, now Pat. No. 10,846,389.
(Continued)

(51) Int. Cl.
*H04L 29/06* (2006.01)
*G06F 21/40* (2013.01)
(Continued)

(52) U.S. Cl.
CPC .............. *G06F 21/40* (2013.01); *G06F 21/34* (2013.01); *G06F 21/35* (2013.01); *G06F 21/57* (2013.01);
(Continued)

(58) Field of Classification Search
CPC .......... G06F 21/34; G06F 21/35; G06F 21/57; G06F 21/6218; G06F 21/32; H04L 9/3215; H04L 9/3234; H04L 9/006; H04L 9/3213

See application file for complete search history.

(56) References Cited

U.S. PATENT DOCUMENTS 6,484,258 B1    11/2002  Haverty
7,360,237 B2    4/2008   Engle et al.
(Continued)

FOREIGN PATENT DOCUMENTS

WO        WO-0026750 A1 *  5/2000   .......... G06F 21/6218

OTHER PUBLICATIONS

Richer, Justin. Oauth 2.0 token introspection. No. rfc7662. 2015. (Year: 2015).*
U.S. Appl. No. 15/654,096, filed Jul. 19, 2017.

*Primary Examiner* — Shawnchoy Rahman
(74) *Attorney, Agent, or Firm* — Leydig, Voit & Mayer, Ltd.

(57) ABSTRACT

Embodiments of the disclosure provide a method for enhancing standard authentication systems to include risk-based decisions. Risk-based decisions can be selectively implemented within existing authentication systems to strategically modify and supplement security if an unacceptable risk is detected. Embodiments capture information pertaining to a user and user device. Information is stored to create a profile for the user and user device. A comparison between the stored information and live data can be performed within authentication systems to optimize security. If the results of the comparison demonstrate the presence of an acceptable risk, then the need for subsequent authentication can be reduced or eliminated, which improves a user experience.

15 Claims, 13 Drawing Sheets

Related U.S. Application Data

(60) Provisional application No. 62/365,479, filed on Jul. 22, 2016.

(51) Int. Cl.

| | | |
|---|---|---|
| *G06F 21/57* | (2013.01) | |
| *H04L 9/32* | (2006.01) | |
| *H04L 9/08* | (2006.01) | |
| *G06F 21/34* | (2013.01) | |
| *G06F 21/62* | (2013.01) | |
| *G06F 21/35* | (2013.01) | |
| *G06F 21/32* | (2013.01) | |
| *H04L 9/00* | (2022.01) | |
| *H04W 12/67* | (2021.01) | |

(52) U.S. Cl.
CPC ........ *G06F 21/6218* (2013.01); *H04L 9/0872* (2013.01); *H04L 9/3215* (2013.01); *H04L 9/3234* (2013.01); *G06F 21/32* (2013.01); *G06F 2221/0708* (2013.01); *G06F 2221/2109* (2013.01); *G06F 2221/2111* (2013.01); *G06F 2221/2137* (2013.01); *H04L 9/006* (2013.01); *H04L 9/3213* (2013.01); *H04W 12/67* (2021.01)

(56) References Cited

U.S. PATENT DOCUMENTS

| | | |
|---|---|---|
| 8,635,662 B2 | 1/2014 | Lang |
| 8,869,306 B2 | 10/2014 | Kelley |
| 9,652,604 B1* | 5/2017 | Johansson ............ H04W 4/021 |
| 9,948,510 B2 | 4/2018 | Kim et al. |
| 10,614,452 B2* | 4/2020 | Tomasofsky ......... G06Q 20/363 |
| 2003/0131264 A1 | 7/2003 | Huff et al. |
| 2006/0288404 A1* | 12/2006 | Kirshnan ............ H04L 41/5096 |
| | | 726/5 |
| 2007/0289005 A1* | 12/2007 | Kumar ................... H04L 63/08 |
| | | 726/10 |
| 2009/0199264 A1 | 8/2009 | Lang |
| 2011/0277025 A1 | 11/2011 | Counterman |
| 2014/0230020 A1 | 8/2014 | Mogaki |
| 2015/0106888 A1 | 4/2015 | Cheng |
| 2015/0220928 A1 | 8/2015 | Allen |
| 2015/0254659 A1 | 9/2015 | Kulkarni |
| 2015/0310194 A1 | 10/2015 | Zhang |
| 2015/0373015 A1 | 12/2015 | Mary |
| 2016/0080383 A1* | 3/2016 | Hockings ............. H04L 9/0894 |
| | | 726/9 |
| 2016/0134616 A1* | 5/2016 | Koushik ................ G06F 21/335 |
| | | 726/9 |
| 2016/0307196 A1* | 10/2016 | Achhra ................ G06F 21/335 |
| 2017/0054792 A1* | 2/2017 | Christopher, II ....... H04L 67/10 |
| 2017/0092054 A1 | 3/2017 | Petersen |
| 2017/0109509 A1 | 4/2017 | Baghdasaryan |
| 2018/0067820 A1* | 3/2018 | Dhuse ................ H04L 67/1097 |

\* cited by examiner

INCORPORATING RISK-BASED DECISION IN STANDARD AUTHENTICATION AND AUTHORIZATION SYSTEMS

CROSS-REFERENCE TO RELATED APPLICATIONS

This patent application is a continuation of copending U.S. patent application Ser. No. 15/654,096, filed Jul. 19, 2017, issued as U.S. Pat. No. 10,846,389, which claims the benefit of U.S. Provisional Patent Application No. 62/365,479, filed Jul. 22, 2016. Each of which are incorporated by reference.

BACKGROUND

Consumers access websites and internet/intranet-based applications to interact with numerous types of information and services. For example, a consumer may log into a health care organization website or application in order to view available products or utilize one of many services offered by the health care organization. Increasingly, consumers not only access these websites and applications with personal computers, but also with smartphones and other electronic devices. In order to provide data security for sensitive information, websites and applications must employ a secure authentication system that can accommodate the full range of devices. Further, increased data security is generally commensurate with inconvenience for consumers, and increased data security may not be necessary for all consumers.

BRIEF SUMMARY

Embodiments of the disclosure provide a method for enhancing standard authentication systems to include risk-based decisions. Risk-based decisions can be selectively implemented within existing authentication systems to strategically modify and supplement security if an unacceptable risk is detected. Embodiments capture information pertaining to a user and user device. Information is stored to create a profile for users and user devices. A comparison between the stored information and live data can be performed within existing authentication systems to optimize security. If the results of the comparison demonstrate the presence of an acceptable risk, then the need for subsequent authentication can be reduced or eliminated.

In one embodiment, a method for providing an enhanced authentication process with risk-based decision making is provided. The method includes: enrolling a user and user device; capturing attributes pertaining to the user and/or user device; determining a risk of data security based on the attributes pertaining to the user and/or the user device; when the risk is an unacceptable risk, requiring additional authentication for access to protected services; and when the risk is an acceptable risk, granting access to the protected services without requiring additional authentication.

In another embodiment, a system for authorizing a user device for access to protected services based on risk-based decisions is provided. The system includes a resource server hosting an application that accesses protected services. The system also includes a user device configured to communicate with the resource server to access the protected services, and an authentication server providing an authentication service for the application that accesses the protected services. The authentication server is configured for performing an authentication process. The authentication process includes: enrolling the user device with the application hosted by the application server; capturing attributes pertaining to a user of the user device and/or the user device; determining a risk of data security based on the attributes pertaining to the user and/or the user device; when the risk is an unacceptable risk, requiring additional authentication for access to the protected services; and when the risk is an acceptable risk, granting access to the protected services without requiring additional authentication.

In yet another embodiment, a non-transitory computer readable storage device for providing an enhanced authentication process with risk-based decision making for granting and maintaining access to an application that accesses protected services is provided. The non-transitory computer readable storage device includes computer executable instructions for performing the steps of: enrolling a user and user device; capturing attributes pertaining to the user and/or the user device; determining a risk of data security based on the attributes pertaining to the user and/or the user device; when the risk is an unacceptable risk, requiring additional authentication for access to protected services; and when the risk is an acceptable risk, granting access to the protected services without requiring additional authentication.

BRIEF DESCRIPTION OF THE SEVERAL VIEWS OF THE DRAWINGS

Exemplary embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the disclosure describe a method for enhancing standard authentication systems to include risk-based decisions. In certain embodiments, risk based decisions performed by the authentication system and based on information gathered from a user device or user profile allow the authentication system to authenticate or reauthenticate a user device or user profile in order to grant or deny access to services and/or information in a more efficient manner. For instance, the user device may not have to be authenticated every time it accesses information and/or services hosted on a resource server utilizing embodiments of the authentication system discussed herein. By increasing the efficiency at which the authentication system authenticates or reauthenticates the user device or user profile in order to grant access to the services and/or information, the user experience becomes more desirable.

An example of the network architecture in which the method may be used includes a resource server for providing access to various network resources including web pages and applications/information, an authentication server for centrally managing an authentication policy, a user directory/device server for centrally managing information concerning users and user devices, and a database for storing the information concerning users and user devices.

Figure 1:
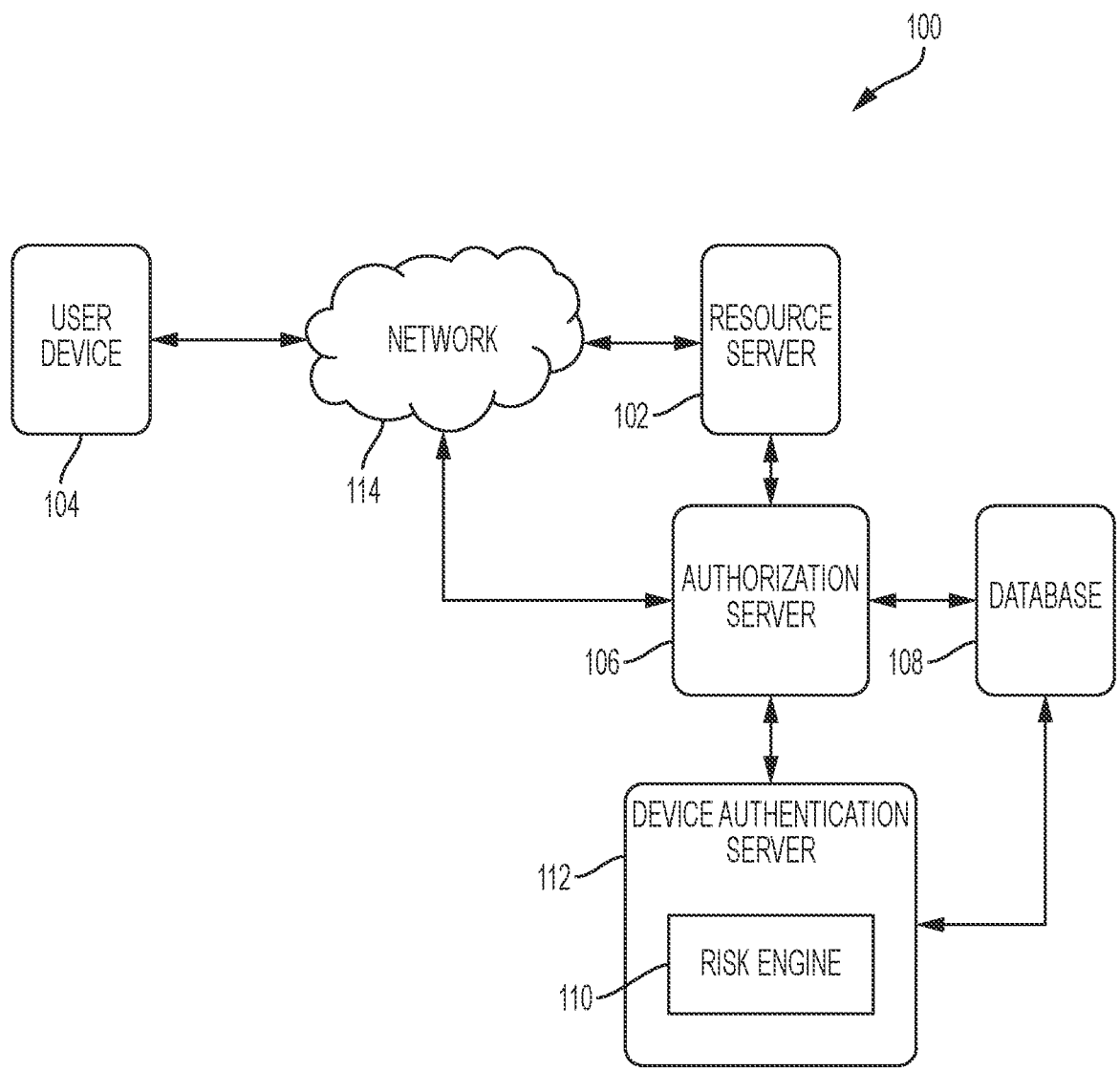
FIG. 1 is an authentication system, in accordance with an embodiment of the disclosure.

FIG. 1 illustrates such an exemplary system providing a network architecture for an authentication system 100. Authentication system 100 includes a resource server 102 that hosts the various network resources including web pages and applications/information. User device 104 is configured as a terminal running an application requesting to access the various network resources including web pages and applications/information hosted by the resource server 102. In the illustrated embodiment, the user device 104 connects to the resource server 102 over a network 114.

Prior to accessing the various network resources including web pages and applications/information hosted at the resource server 102, the user device 104 must be authenticated. An authorization server 106, associated with the resource server 102, performs the authentication/reauthentication of the user device 104 by calling a device authentication server 112. In the illustrated embodiment, only a single device authentication server 112 is provided; however, in other embodiments, a plurality of device authentication servers may be present to provide various types of authentication.

The authorization server 106 authenticates the user device 104 by collecting data from the user device 104 and providing it to the device authentication server 112 for comparing it with data previously stored in a database 108 associated with the user device 104. In certain embodiments, the authorization server 106 and the device authentication server 112 may collectively be referred to as an authentication server.

An authentication process is performed by a Risk Engine 110 hosted by the device authentication server 112. The Risk Engine 110 accesses data stored in the database 108 pertaining to the user device 104 and/or a user profile of the user of the user device 104 in order to make an efficient authentication or reauthentication of the user device 104 prior to granting/continuing access to the various network resources including web pages and applications/information of the resource server 102. When a user device and/or a user profile are enrolled with the Risk Engine 110, user device and/or user profile attributes are collected and stored in the database 108. In certain embodiments, these user device and/or user profile attributes are compiled to determine an associated score value that sets a threshold associated with a specific authentication method for future authentications performed by the Risk Engine 110.

Some embodiments may use the term "system" to generally refer to a network architecture, such as the network architecture of the authentication system 100 of FIG. 1. This system (authentication system 100) may be used, for example, by a health care organization that offers web-based services to consumers. To enhance understanding, the example authentication system 100 in FIG. 1 is provided to describe exemplary features of the method described herein. However, any suitable network architecture may be used to accomplish objectives of the invention. In some embodiments, the "user" may refer to a consumer, such as a person who is seeking health related services through a service hosted by a health care organization through a website or web-based application.

Figure 2:
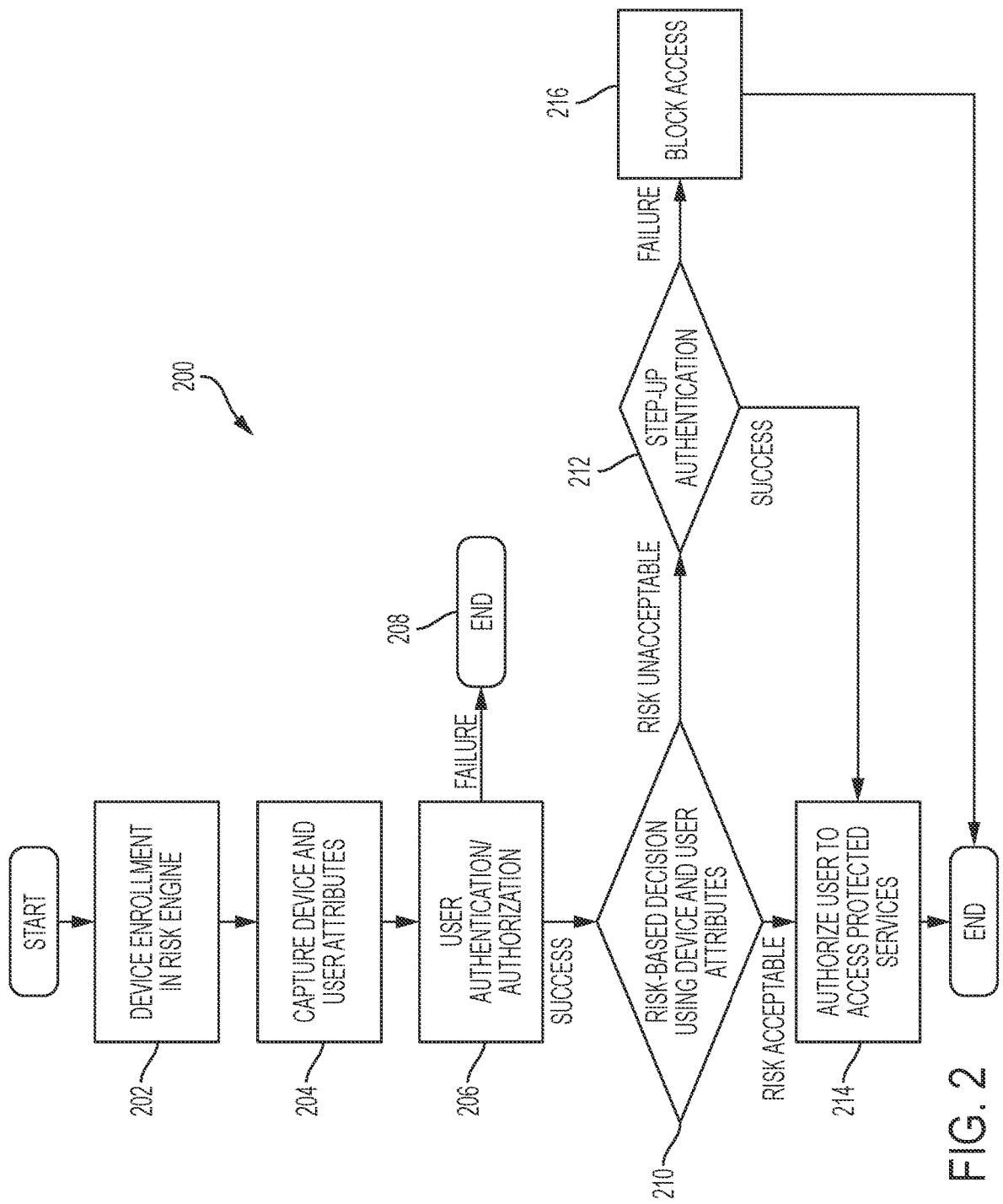
FIG. 2 is a flow chart illustrating risk-based decision making within a back end system to enhance security, in accordance with an embodiment of the disclosure.

FIG. 2 illustrates a flow chart 200 showing an embodiment of an enhanced authentication system incorporating an authentication method utilizing risk-based decision making. The process begins at step 202 with a user enrolling in the Risk Engine 110 (see FIG. 1). In certain embodiments, as shown in FIG. 1, the Risk Engine 110 is located within the device authentication server 112, and configured to analyze user and user device attributes and compute risk. Enrollment with the Risk Engine 110 creates a user device and/or user profile stored in the database 108. The Risk Engine 110 accesses the database 108 in order to create this profile.

As an aside, and in general with respect to FIGS. 2-11, the user profile is accessed by the Risk Engine 110 whenever a risk-based decision regarding authentication needs to be performed. In certain embodiments, the Risk Engine 110 determines whether step-up authentication is needed in order to provide access to sensitive data or services based on the outcome of the risk-based decision. In certain embodiments, the risk-based decision is performed by the Risk Engine 110 calculating a risk score based on the collected attributes and compares that to a score for the user device 104 that was previously determined and stored in the database 108. If the score exceeds the previously determined device score, then the risk is deemed to be acceptable; however, if it does not exceed the previously determined device score, then the risk is deemed unacceptable.

Returning to FIG. 2, at step 204, user profile and/or user device attributes are captured and then stored in the database 108 (see FIG. 1). In an embodiment, these attributes may also be simultaneously captured and stored in the database 108. In an embodiment, these attributes are stored such that they can subsequently assist in making risk-based decisions as to the likeliness of user and/or user device activity actually being from a user device and/or user with a profile stored in the database 108, as performed at step 202. Embodiments may capture and store attributes before or after the user logs into the health care organization's website via the resource server 102. The database 108 is occasionally updated when updated user device and/or user profile information is available to the Risk Engine 110. In an embodiment, the database 108 is updated whenever new user device and/or user profile attributes are available. This is accomplished by the user device 104 automatically sending the data to the Risk Engine 110, or, in other embodiments, the authorization server 106 may collect the updated information when the user device 104 is connected to the resource server 102.

Any attribute can be used that furthers the goal of making risk-based decisions. For example, attributes may relate to cryptographic keys such as certificates issued to the user or user device. Attributes may also relate to an environment such as geographic location, time of day, day of week, or device hygiene, all related to the user device 104. Attributes may also relate to user behavior such as usage patterns, swipe patterns, etc. A non-exhaustive list of attributes used in device authentication is: malware detection; jailbreak/root detection; debugger detection (detecting if a debug session is attached to the application); location reading, accelerometer readings; gyroscope readings; compass readings; user navigation patterns; user swipe pattern; application tamper detection; device identifier (both software and/or hardware); an IMEI, device hardware details (CPU, RAM, GPU, etc.); a device certificate (either granted by an authentication server or provided by the device); a date and time; device software details (OS version, installed applications, etc.); a PIN/password or biometric protection on the device; a device token (hardware and/or software); a WiFi® Network ID (SSID); whether a device is plugged in; network proxy detection; and VPN detection. It will be understood to those of ordinary skill in the art that the number and types of attributes are not intended to be limited to any specific examples or combinations.

At step 206, the user device 104 is authenticated/authorized to access the resource server 102 (see FIG. 1). The authorization server 106 performs this authentication/authorization according to an authentication policy adhered to by the device authentication server 112. Embodiments are not limited to any particular form of authentication performed by the device authentication server 112. For example, authentication may be accomplished using a password, biometrics, and so forth. If the authentication fails, then the authentication process terminates at step 208.

However, if authentication is successful, at step 210, the authentication is enhanced by incorporating a risk-based decision utilizing the captured attributes. As an aside, step 210 may be an authentication or reauthentication at any time subsequent to enrollment and capturing user profile and user device attributes at steps 202 and 204. For example, a user may log into the resource server 102 (see FIG. 1) provided by a health care organization seeking to access personal information and health care plans, and a risk-based decision may be desirable if a user requests access to new or different services or simply needs to be reauthenticated. For instance, after expiration of a certain period of time from when the user first authenticates, a reauthentication may be performed such that security is maintained during the period of time the user device 104 accesses the resource server 102. This reauthentication may utilize a risk-based decision to increase efficiency and security of the reauthentication.

Step 210 is performed by the Risk Engine 110 of the device authentication server 112 requesting user device and/or user profile attributes from the user device 104 and computing a risk of data security based on the previously collected and stored user device and/or user profile attributes. If the result of this risk-based decision is that the risk is unacceptable, then, at step 212, the system will step-up authentication in order to provide a higher level of assurance. For example, the system may require the user device to provide further information or collect biometric data. Authorization is granted, at step 214, if the system determines that the step-up authentication is successful; however, if the step-up authentication at step 212 is not successful, then, at step 216, access to the resource server 102 is blocked.

Returning to step 210, if the result of the risk-based decision is that the risk is acceptable, then authorization to the protected services hosted by the resource server 102 is granted at step 214. In this manner access to the resource server 102 is provided in an efficient manner.

Figure 3:
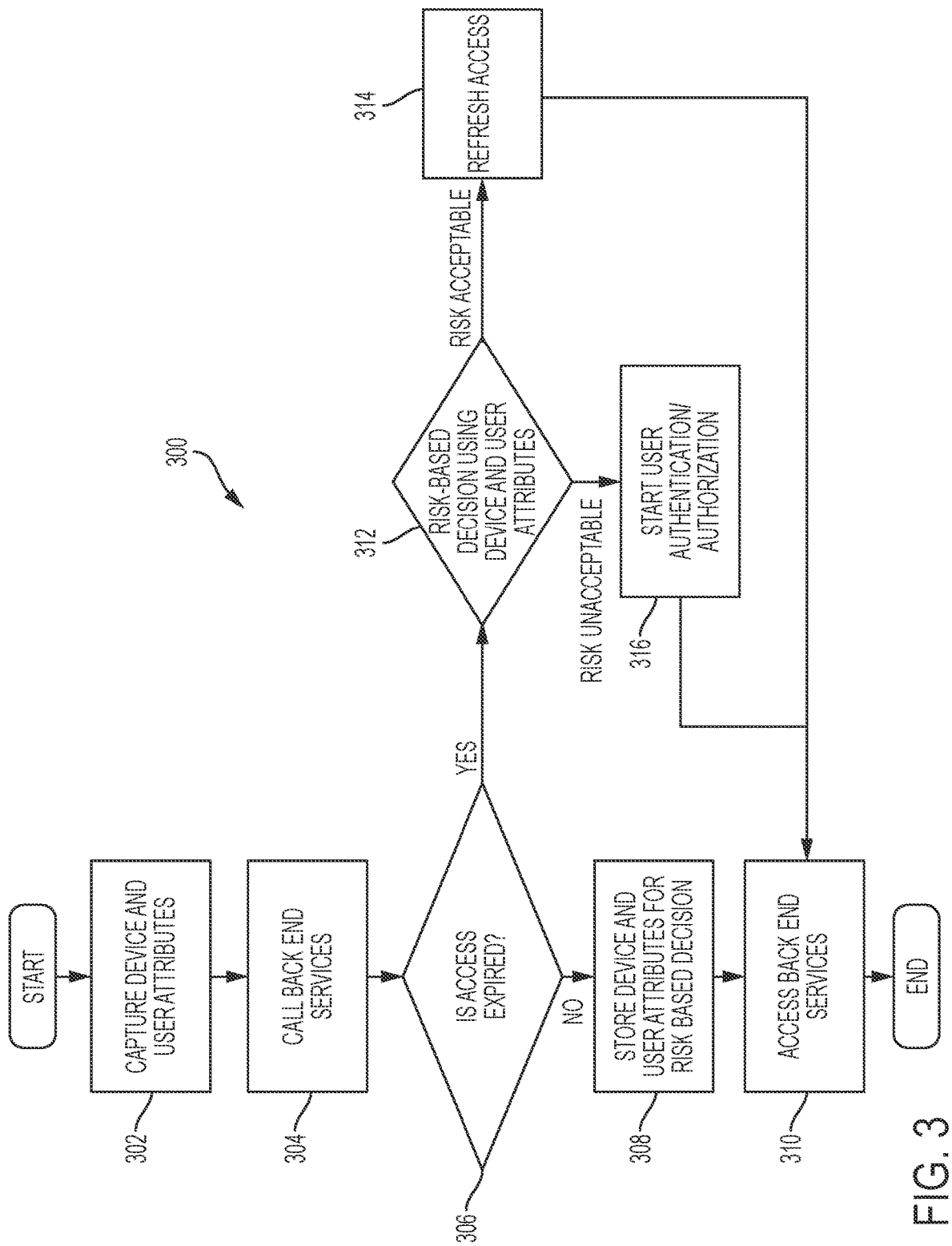
FIG. 3 is a flow chart illustrating risk-based decision making being used upon token refresh, in accordance with an embodiment of the disclosure.
Figure 4:
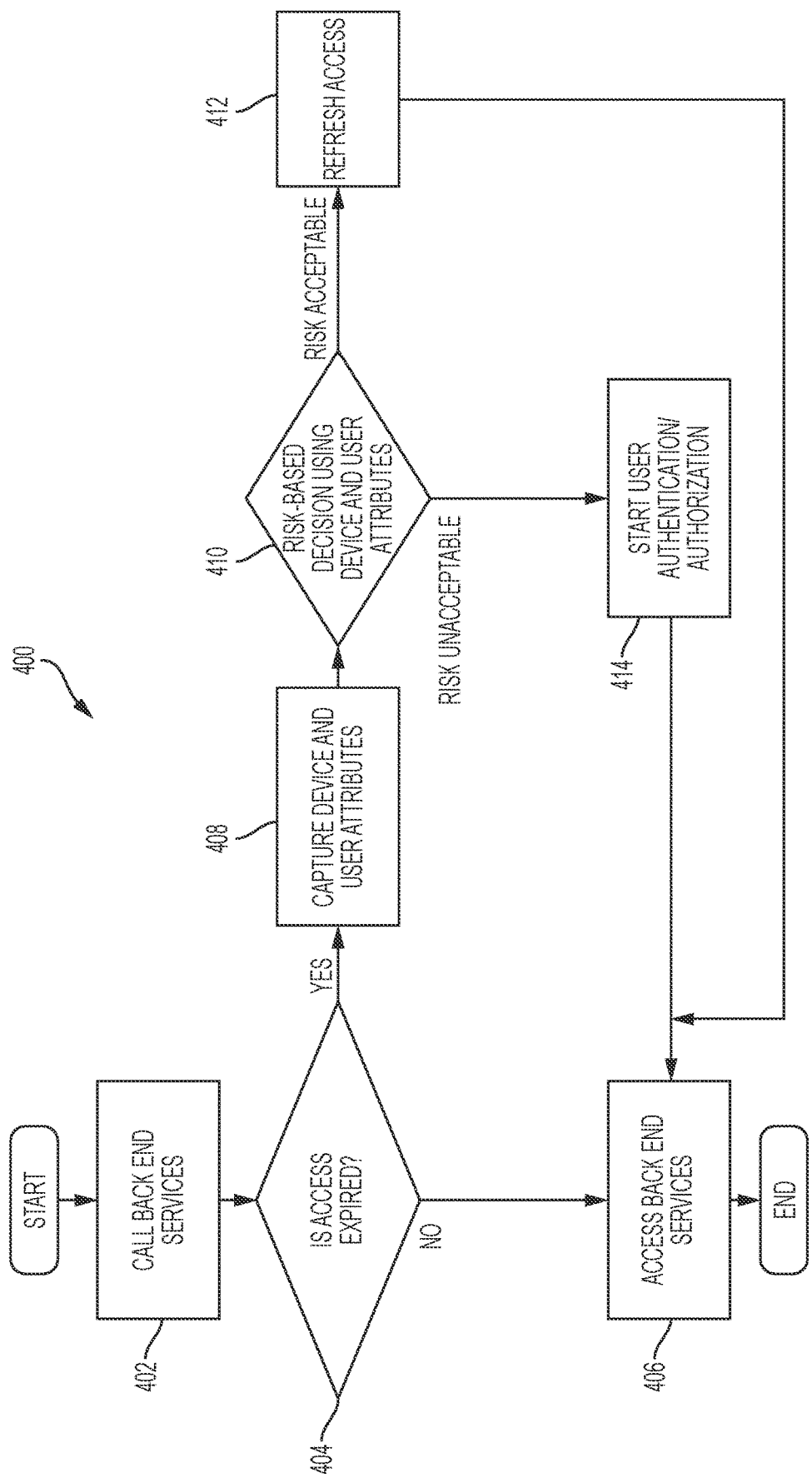
FIG. 4 is a flow chart illustrating risk-based decision making being used upon token refresh, in accordance with an embodiment of the disclosure.
Figure 5:
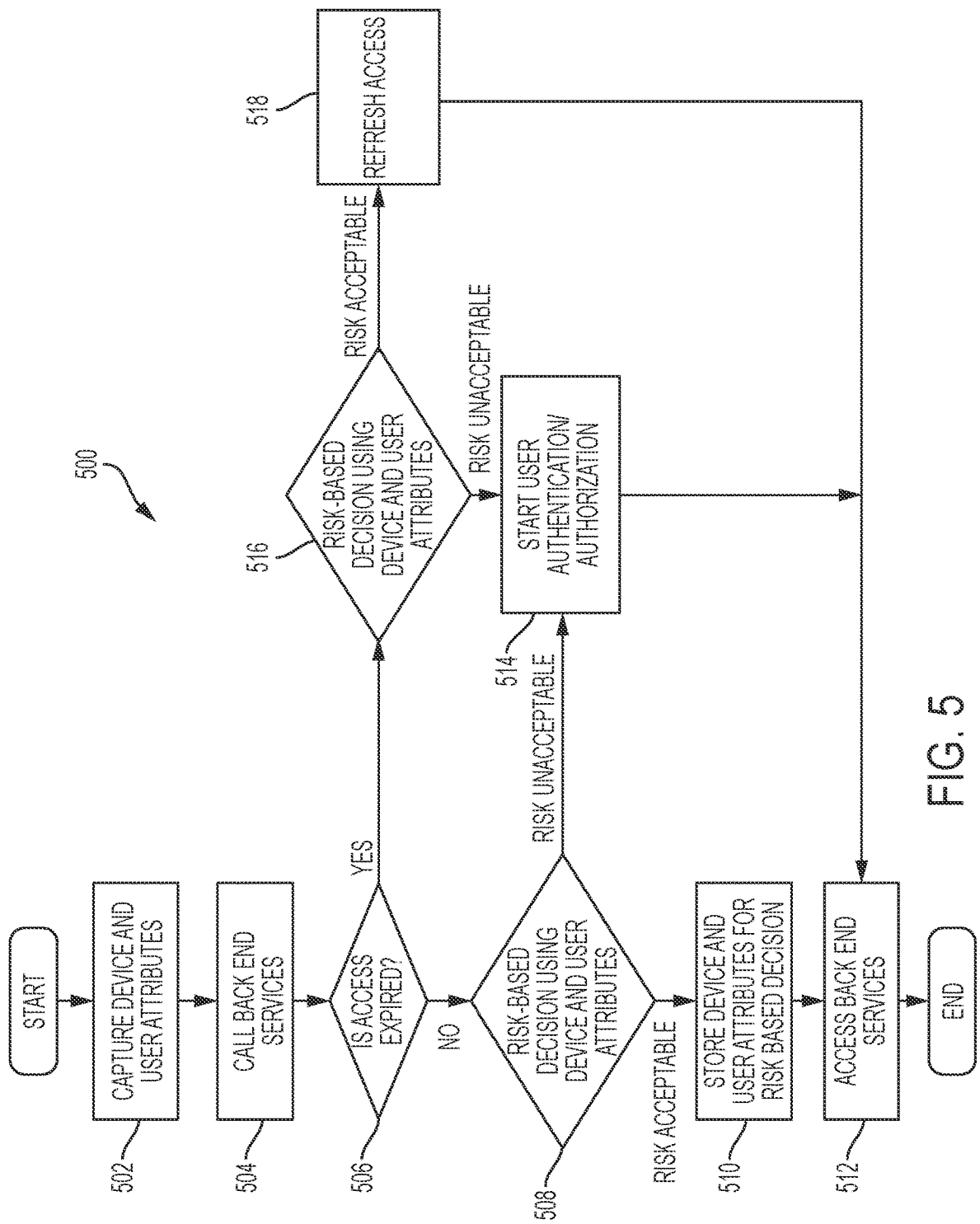
FIG. 5 is a flow chart illustrating risk-based decision making being used upon token refresh, in accordance with an embodiment of the disclosure.

Embodiments of the enhanced authentication system are not limited to the method described in FIG. 2. For example, FIGS. 3-5 provide examples of incorporating risk-based decision making upon token refresh. It will be apparent to those of ordinary skill that these embodiments merely serve as examples and are not intended to be exhaustive. Embodiments may vary depending on efficiency or compatibility with existing network architectures, for example.

In the embodiments shown in FIGS. 3-5, for example, the user is issued an access token containing information pertaining to various access security groups after a user is authenticated. When the user attempts to access a secure webpage, network resource or application, the token is checked to ensure the user has access permission. The user will be granted authorization if the token contains the appropriate access credentials. In an embodiment, the token expires after a discrete time period. In traditional authentication systems, the user must be re-authenticated when the time period expires.

FIG. 3 illustrates a flow chart 300 providing an embodiment of the enhanced authentication system employing a risk-based decision upon token refresh. In this variation, as shown in FIG. 3, a user device has already been authenticated and authorized to access secure information within the resource server 102 (see FIG. 1). The authorization server 106, associated with the resource server 102, may, for example, have granted a token upon an initial successful authentication and requires the token to be refreshed upon expiration of the discrete time period.

At step 302, user device and/or user profile attributes are captured by the authorization server 106 (see FIG. 1) while the user device 104 is accessing the resource server 102. At step 304, the authorization server 106 calls back end services in order to determine whether the token has expired. After a back end service is called, at step 306, the authorization server 106 determines whether the token has expired. If the token has not expired, at step 308, the authorization server 106 stores attributes associated with the user and/or user device, and, at step 310, accesses back end services so to maintain the connection between the user device 104 (see FIG. 1) and the resource server 102. However, at step 306, if it is determined that the token has expired, the authorization server 106 references the Risk Engine 110 of the device authentication server 112 to make a risk-based decision using user profile and/or user device attributes at step 312. If the Risk Engine 110 determines the risk is acceptable, it refreshes the token at step 314. If the system finds the risk is unacceptable, authentication is required for continued access at step 316.

FIG. 4 illustrates flow chart 400 providing another example of incorporating a risk-based decision upon token refresh. At step 402, the authorization server 106 (see FIG. 1) calls back end services, and, at step 404, determines whether the token has expired. If the token has not expired, then, at step 406, the authorization server 106 accesses back end services so to maintain the connection between the user device 104 and the resource server 102.

Alternatively, if it is determined that the token has expired at step 404, then user profile and/or user device attributes are captured at step 408. Then, after capturing the user and user device attributes, at step 410, the Risk Engine 110 of the device authentication server 112 proceeds to make a risk-based decision on whether to refresh the token or require another authentication/authorization to maintain access to the resource server 102 for the user device 104. If the Risk Engine 110 determines the risk is acceptable, at step 412, it refreshes the token. If the system finds the risk is unacceptable, at step 414, authentication is required for continued access.

Referring to FIG. 5, a flow chart 500 provides another example of incorporating risk-based decision upon token refresh. Similar to the embodiment shown in FIG. 3, at step 502, user and user device attributes are captured prior to the system determining whether the token has expired. In contrast to the variation shown in FIG. 3, the system makes a risk-based decision after the determination of whether the token has expired. This is performed in order to determine whether additional user device and/or user profile attributes should be collected and stored for further risk-based decisions.

As shown in FIG. 5, at step 504, back end services are called in order to access the token to determine whether the token has expired, at step 506. If the token has not expired, at step 508, the Risk Engine 110 (see FIG. 1) of the device authentication server 112 will make a risk-based decision with the user profile and/or user device attributes. If the Risk Engine 110 determines the risk is acceptable, it collects user profile and/or user device attributes at step 510 and calls back end services at step 512. Alternatively, if it is determined that the risk is unacceptable at step 508, then authentication is required for continued access at step 514.

Returning to step 506, if it is determined that the token has expired, then, at step 516, the Risk Engine 110 (see FIG. 1) makes a risk-based decision with the user profile and/or user device attributes. If the Risk Engine 110 determines the risk is acceptable, the token is refreshed at step 518 for continued access to the resource server 102 by the user device 104. If the risk is not determined to be acceptable, then, at step 514, authentication is required for continued access.

Figure 6:
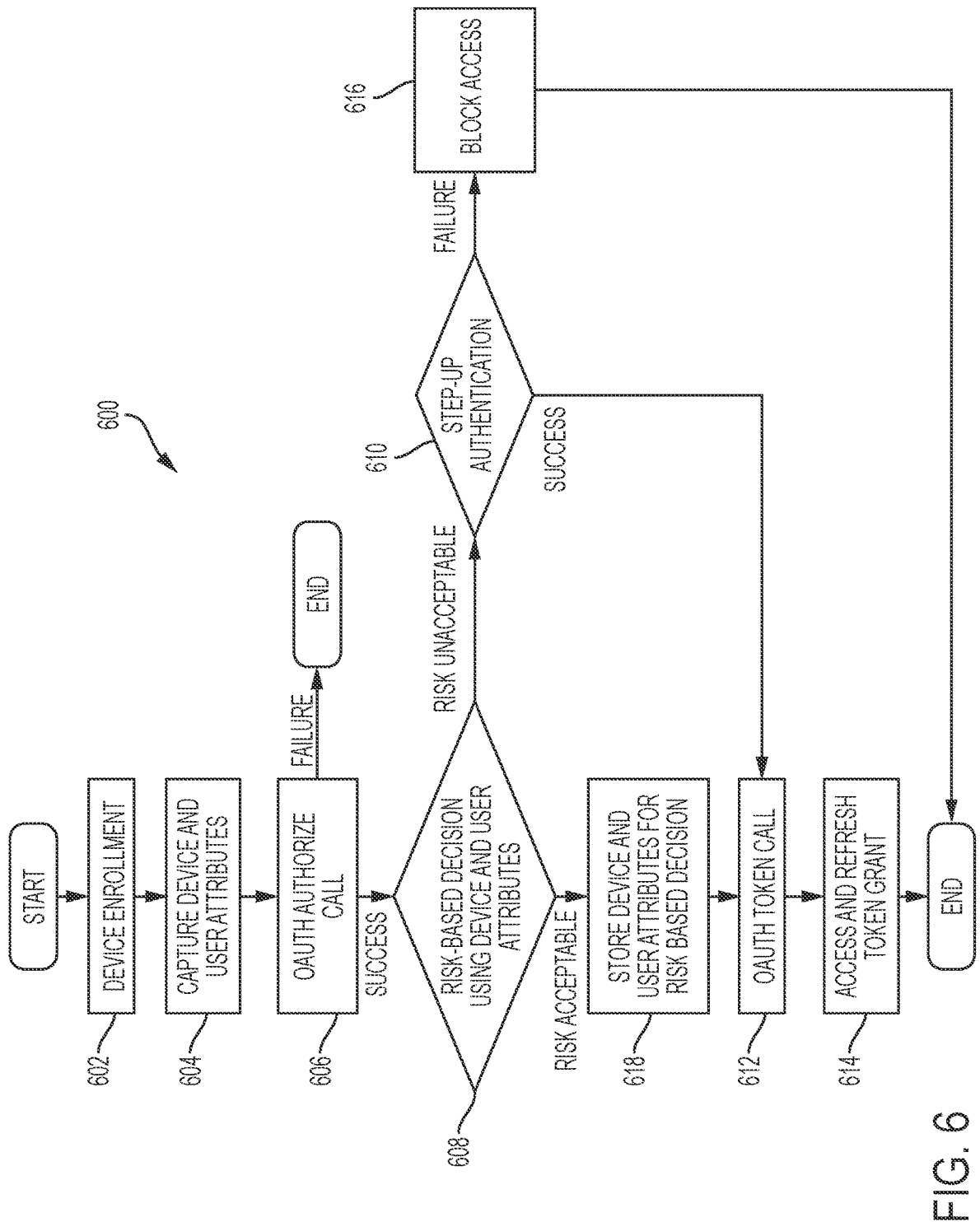
FIG. 6 is a flow chart illustrating use of risk-based decision making to enhance an authentication system using OAuth, in accordance with an embodiment of the disclosure.

FIG. 6 illustrates a flow chart 600 providing a method of using risk-based decision making to enhance an authentication system using the OAuth specification. OAuth is an authorization framework defining a delegation protocol for allowing an application to receive limited access to user information from a third-party application. For example, the resource server 102 of a health-service organization hosting a web-based application may ask a user to grant limited access to information from an application such as Facebook® or PayPal®. The OAuth specification provides an efficient mechanism for routing authorization between these web-based services and applications.

Referring to FIG. 6, at step 602, the user device is first enrolled with the Risk Engine 110 (see FIG. 1). At step 604, user profile and/or user device attributes are captured in the database 108. In an embodiment, the attributes may also be simultaneously stored in the database 108. For example, attributes are captured and stored when a user device is authenticated to the health care organization's website hosted by the resource server 102. Embodiments may also capture attributes after the user authenticates with the resource server 102.

Next, at step 606, the authorization server 106 (see FIG. 1) calls the OAuth protocol. If successful, at step 608, the Risk Engine 110 of the device authentication server 112 proceeds to make a risk-based decision using the user profile and/or user device attributes. If the system finds the risk is unacceptable, at step 610, it is determined that step-up authentication is required for an Oauth token call, at step 612, followed by granting access and refreshing the token at step 614. If the step-up authentication at step 610 fails, then access to the resource server 102 is blocked at step 616. Returning to step 608, if the device authentication server 112 finds the risk is acceptable, it proceeds to store device and user attributes to be used for future risk based decisions at step 618 and then performs an OAuth token call at step 612, and grants access and refreshes the token at step 614.

Figure 7:
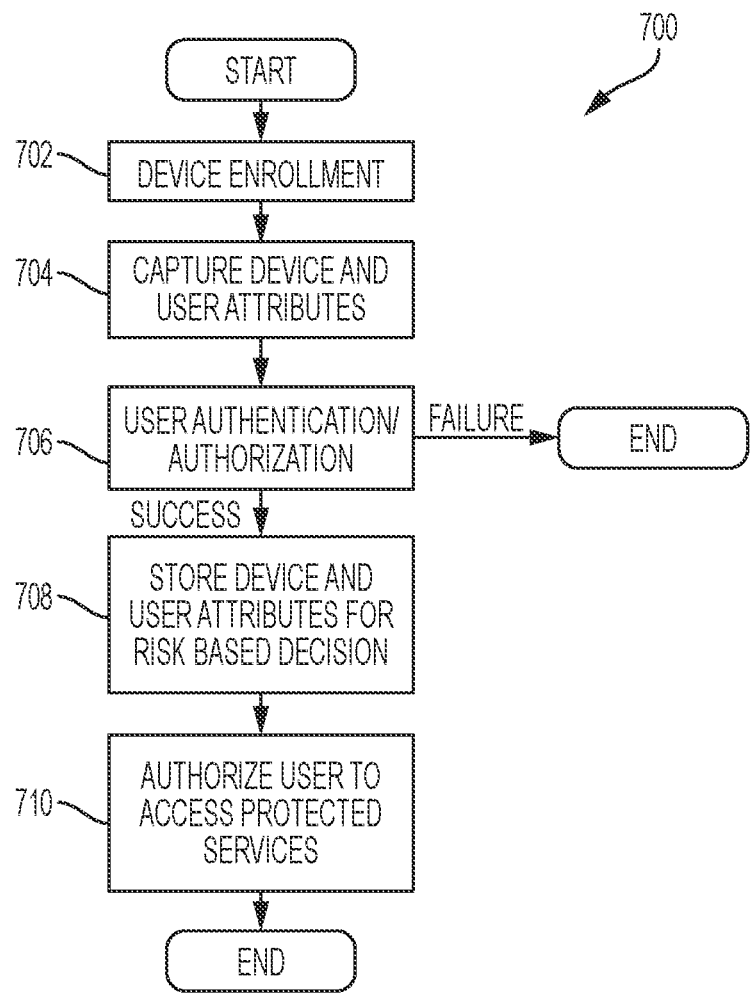
FIG. 7 is a flow chart illustrating how user and user device attributes may be captured and stored, in accordance with an embodiment of the disclosure.
Figure 8:
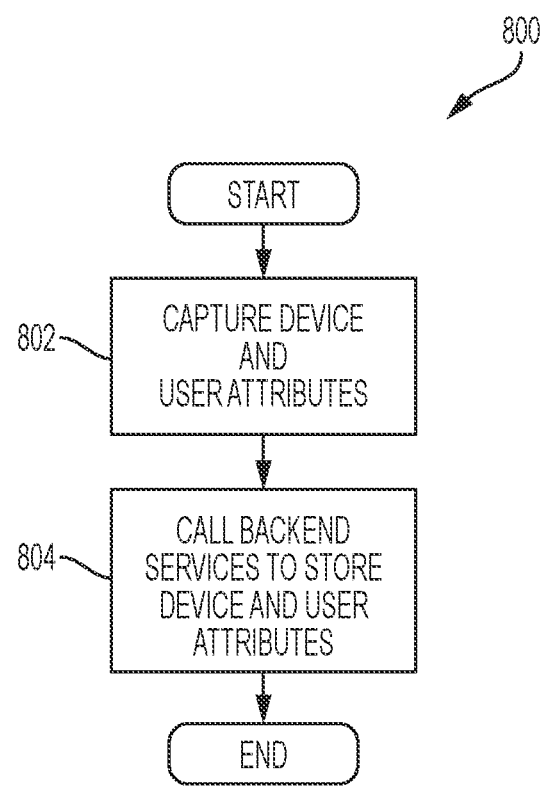
FIG. 8 is a flow chart illustrating how user and user device attributes may be captured and stored, in accordance with an embodiment of the disclosure.

FIGS. 7 and 8 illustrate examples of how the system can capture and store information for making risk-based decisions. FIG. 7 illustrates flow chart 700 providing a method for strategically capturing and storing user device and/or user profile attributes. For example, the system may be configured to capture and store attributes when a user seeks to access information that requires a higher level of security than other information. These attributes may, for example, be given greater weight in future authentication requests. As shown in FIG. 7, at step 702, a user device is enrolled with the authorization server 106 (see FIG. 1). In certain embodiments, this enrollment may be to provide access to the resource server 102, which in other embodiments, the enrollment may not grant access to the resource server 102 without further authentication and authorization needed. At step 704, the authorization server 106 captures attributes of the user profile and/or user device. Using the collected attributes, the authorization server 106 authenticates the user, and if successful, the system stores the user profile and/or user device attributes at step 708, and authorizes access to the resource server 102 for the user device, at step 710.

FIG. 8 illustrates a flow chart 800 providing a method whereby information can be captured after a user device, such as user device 104 (see FIG. 1), has already been authenticated and authorized. In this embodiment, at step 802, the authorization server 106 captures user profile and/or user device attributes, and, at step 804, calls backend services to store those services within the database 108. In an embodiment, the system may also store the information for use at a later time (not shown).

Figure 9:
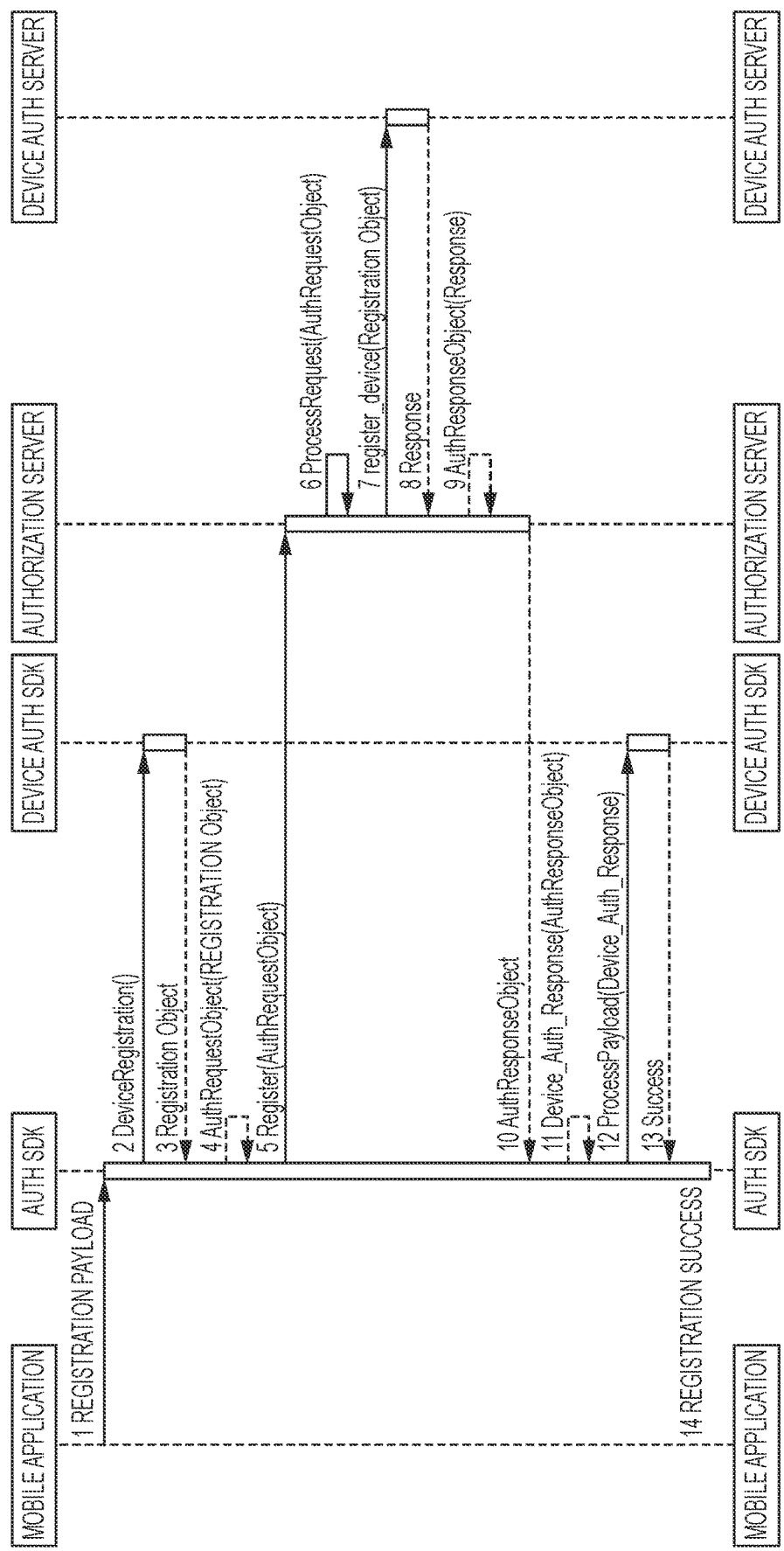
FIG. 9 is a device authentication registration message flow chart, in accordance with an embodiment of the disclosure.
Figure 10A:
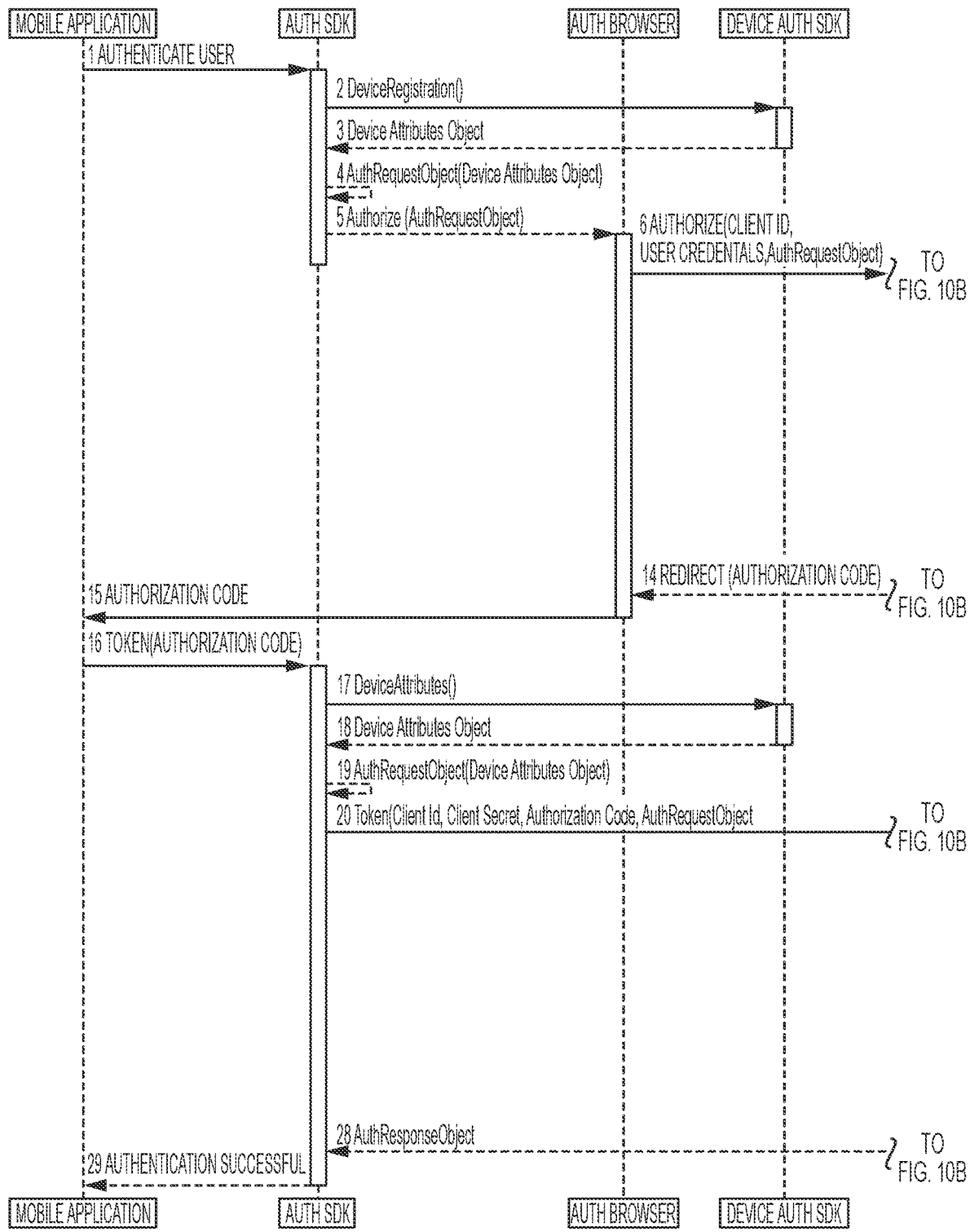
FIGS. 10A and 10B illustrate a device authentication token generation message flow chart, in accordance with an embodiment of the disclosure.
Figure 10B:
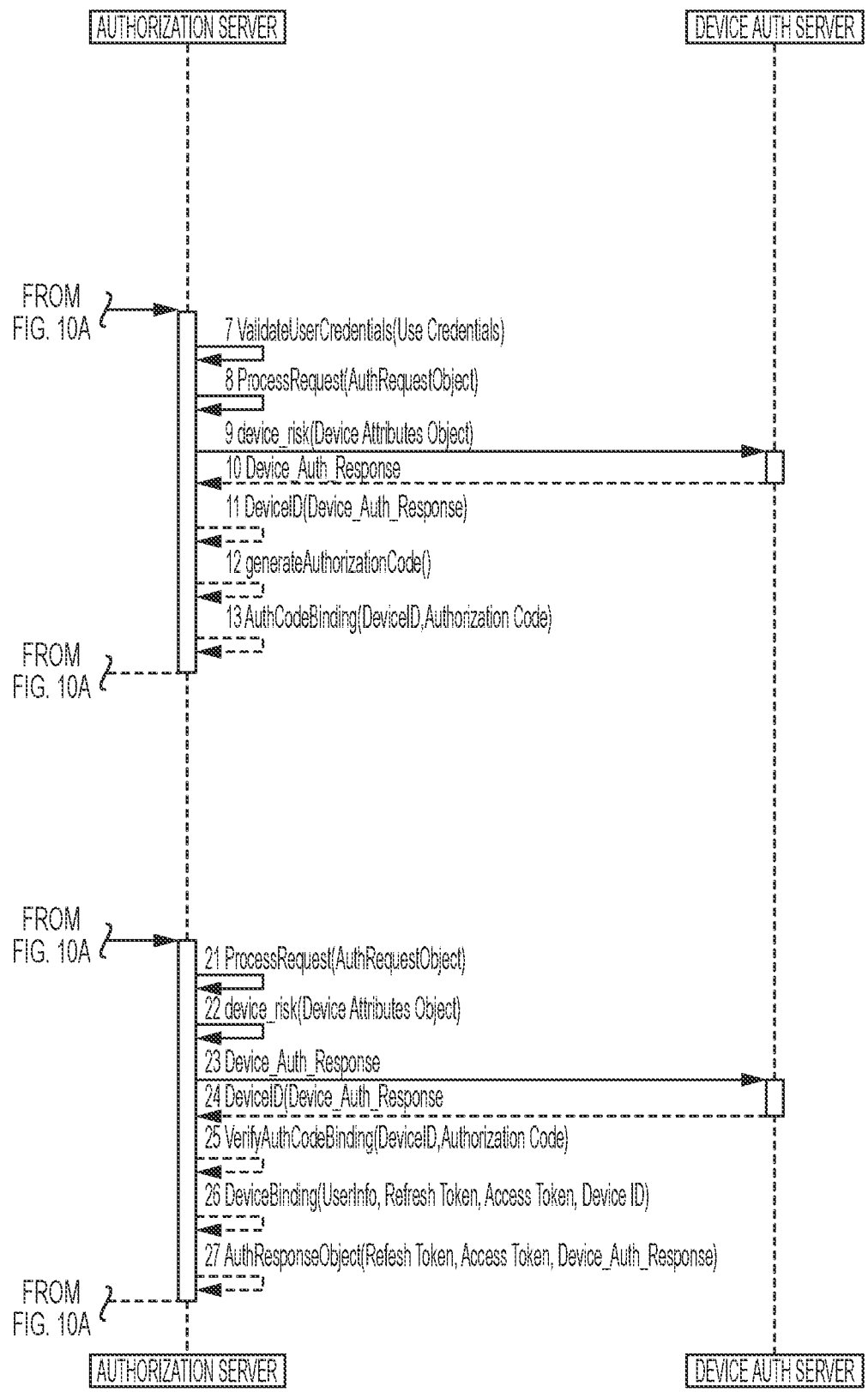
Figure 11:
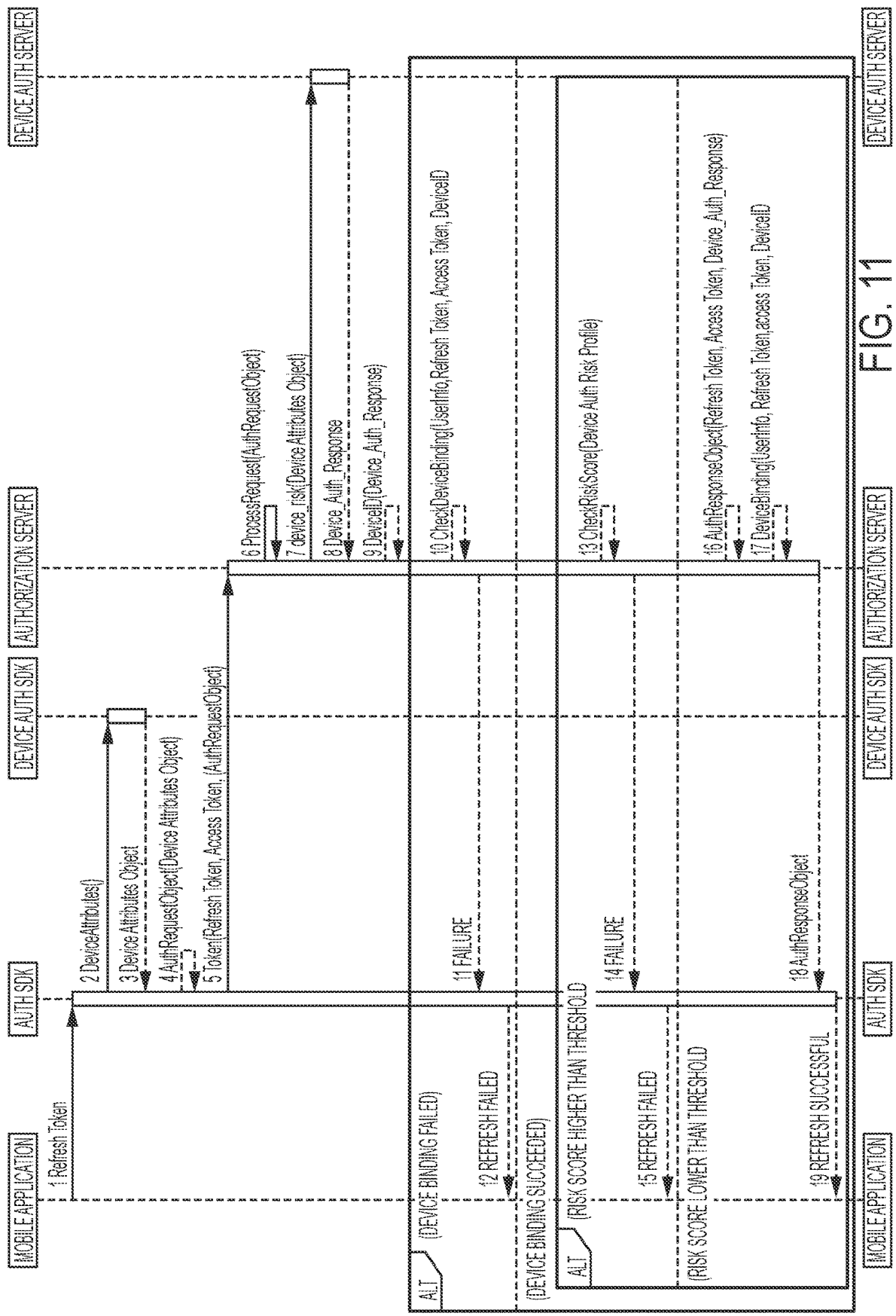
FIG. 11 is a device authentication token refresh message flow chart, in accordance with an embodiment of the disclosure.

Turning now to FIGS. 9-11, message flow charts for device registration and token generation and refresh are provided. FIG. 9 is directed to a device registration with the authentication system such that it can be authenticated with respect to the various processes and methods discussed is reference to FIGS. 2-8. In the illustrated embodiment, the registration process of FIG. 9 will occur upon launch of a user device application that accesses a resource server (such as resource server 102 of FIG. 1). The user device registration is utilized to create a registration object with an authorization server (such as the authorization server 106) for a user device (such as user device 104) running the application.

With reference to FIG. 1, in certain embodiments, this registration object is created and processed by the authentication sever 106 (see FIG. 1) that in turn provides that object to a device authentication server 112 that actually registers the device 104. If the application is launched from a device that has not previously been registered, then the new device registration object will be stored in the database 108 upon generation for later access during any subsequent application session. Alternatively, if the device has been previously registered, then the authorization server 106 will be able to retrieve the previously created object along with any previously created certificates for use by the authentication system 100.

In FIG. 9, at step 1 of the device registration message flow chart, the application, running on the user device 104 (see FIG. 1), calls a Registration Payload message exposed by an authentication Software Development Kit (SDK) interface residing in the application running on the user device 104. At steps 2-5, the authentication SDK sends the registration payload message to a device authentication SDK residing in the authorization server 106 that returns a registration object back to the authentication SDK. The authentication SDK then creates an authentication request object that is sent to the authorization server 106 (see FIG. 1).

At steps 6-9, the authorization server 106 (see FIG. 1) processes the authentication request object and sends the request object to a device authorization server 112. The device authorization server 112 reviews the registration object and determines a response of whether the device may be registered by the authorization server 106. That response is provided to the authorization server 106 that in turn creates an authorization response object, which is sent to the authentication SDK.

At steps 10-13, the authentication SDK receives the authentication response object and processes the payload of that authentication response object and sends it to the device authentication SDK to determine whether registration was a success. In the illustrated embodiment, the registration is a success, and the device authentication SDK returns that the registration was successful to the authentication SDK, which, at step 14, sends a registration success message to the application running on the device 104 (see FIG. 1).

FIG. 10 illustrates a message flow chart for token generation. In certain embodiments, the flow chart for token generation of FIG. 10 is utilized with the methods of FIGS. 3-5 regarding token generation and refresh. At step 1, the application sends an authenticate user message to the authentication SDK. At steps 2-5, the authentication SDK communicates with the device authentication SDK to collect device attributes and convert the device attributes to a device attributes object that is packaged as a device attributes authentication request object. The device attributes authentication request object is then sent to an authentication browser that is part of the application running on the user device 104 (see FIG. 1).

At step 6, the authentication browser sends the device attributes authentication request object and user credentials to the authorization server 106 (see FIG. 1). At steps 7-12, the authorization server 106 processes the device attributes authentication request object. A device risk is determined by the authorization server 106 unpacking the device attributes from the device attributes authentication request object and sending them to the device authorization sever 112. The device authorization server 112 reviews the device attributes and returns a device authentication response to the authorization server 106. The authorization server 106 obtains a device ID and creates an authorization code. The authorization code, which is bound to the device ID, is in turn sent back to the authentication browser at step 13, and at step 14, the authentication browser sends the authorization code to the application.

Steps 16-29 of FIG. 10 illustrate a message flow chart for obtaining a token for authentication. At step 16, the application sends a token message by passing the authorization code to the authentication SDK. At steps 17-20, the authentication SDK packages the device attributes and authorization code into an authentication request object and proceeds to send the token message with the authentication request object to the authorization server 106 (see FIG. 1).

At steps 21-29 of FIG. 10, the authorization server 106 processes the request for authentication, un-packages the device attributes from the request and sends them to the device authorization server 112 that reviews the attributes and returns a device authentication response to the authorization server 106. The device authentication contains the device ID. The authorization server 106 verifies whether the authorization code was bound to the same user device, and if verification is successful, the authorization server 106 generates the tokens and binds them to the device ID. The authorization server 106 then creates an authentication response object containing the token and sends that response object to the authentication SDK, which then returns a message to the application indicating that the authentication was successful.

FIG. 11 illustrates a message flow chart for a token refresh. In the illustrated embodiment, after expiration of the token, at step 1, the application sends a refresh token message to the authentication SDK. At steps 2-5, the authentication SDK collects device attributes and sends them to the device authentication SDK to bundle as a device attributes object. The device authentication SDK sends back the device attributes object to the authentication SDK, which bundles the device attributes object into a token refresh message sent to the authorization server 106 (see FIG. 1).

At steps 6-9, the authorization server 106 (see FIG. 1) processes the token refresh message and sends a device risk request containing the device attributes object to the device authentication server 112. The device authentication server 112 reviews the device attributes and returns a response with the user device credentials to the authorization server 106, and the authorization server 106 converts this to a response object.

Steps 10-12 represent an alternative where the device binding has failed. At step 10, the authorization server 106 (see FIG. 1) checks the device binding of the response object and determines that the binding has failed. At step 11, the authorization server 106 sends a failure message to the authentication SDK. At step 12, the authentication SDK sends a refresh failed message to the application at the user device 104.

Steps 13-15 represent an alternative where the device binding has not failed, but a risk score is determined to be higher than a threshold indicating an un-acceptable risk. At step 13, assuming the binding has not failed, the authorization server 106 (see FIG. 1) checks a risk score of the device authentication risk profile by comparing the device attributes to a stored risk profile for the device 104. In the illustrated embodiment, the risk score is determined to be too high to refresh the token. Therefore, at step 14, the authorization server sends a failure message to the authentication SDK. At step 15, the authentication SDK sends a refresh failed message to the application at the user device 104.

Steps 16-19 represent an alternative where the device binding has passed and the risk score is lower than a threshold indicating an acceptable risk. At step 16, the authorization server 106 (see FIG. 1) creates a response object, and at step 17 it creates a device binding of the refreshed token and user device credentials, such as a device ID and user information. At step 18, the authorization server 106 sends the response object to the authentication SDK. At step 19, the authentication SDK sends a refresh successful message to the application at the user device 104.

Figure 12:
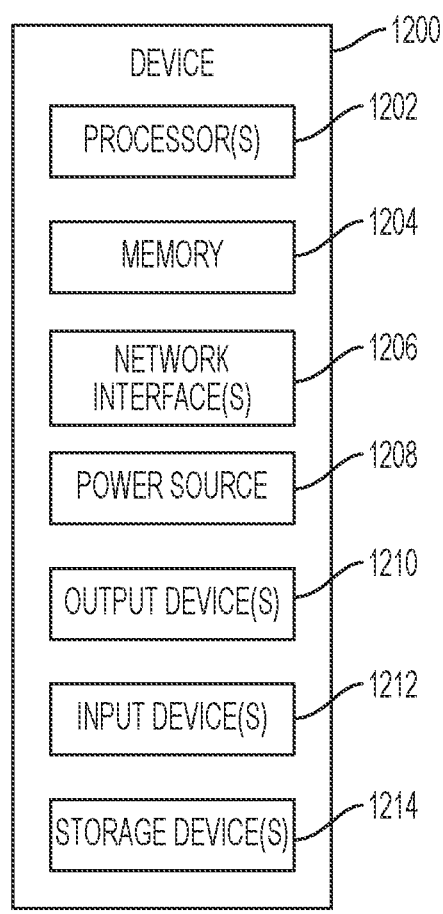
FIG. 12 provides an electronic device according to an embodiment of the disclosure.

FIG. 12 illustrates an electronic device 1200 according to an embodiment of the disclosure. Electronic devices, for example, servers and user devices comprising the resource server 102, user device 104, authorization server 106, database 108, and device authentication server 112 running the Risk Engine 110, in certain embodiments, may be computer devices as shown in FIG. 12. The device 1200 may include one or more processors 1202, memory 1204, network interfaces 1206, power source 1208, output devices 1210, input devices 1212, and storage devices 1214. Although not explicitly shown in FIG. 12, each component provided is interconnected physically, communicatively, and/or operatively for inter-component communications in order to realize functionality ascribed to the various entities identified in FIG. 1 and referenced in FIGS. 2-11. To simplify the discussion, the singular form will be used for all components identified in FIG. 12 when appropriate, but the use of the singular does not limit the discussion to only one of each component. For example, multiple processors may implement functionality attributed to processor 1202.

Processor 1202 is configured to implement functions and/or process instructions for execution within device 1200. For example, processor 1202 executes instructions stored in memory 1204 or instructions stored on a storage device 1214. In certain embodiments, instructions stored on storage device 1214 are transferred to memory 1204 for execution at processor 1202. Memory 1204, which may be a non-transient, computer-readable storage medium, is configured to store information within device 1200 during operation. In some embodiments, memory 1204 includes a temporary memory that does not retain information stored when the device 1200 is turned off. Examples of such temporary memory include volatile memories such as random access memories (RAM), dynamic random access memories (DRAM), and static random access memories (SRAM). Memory 1204 also maintains program instructions for execution by the processor 1202 and serves as a conduit for other storage devices (internal or external) coupled to device 1200 to gain access to processor 1202.

Storage device 1214 includes one or more non-transient computer-readable storage media. Storage device 1214 is provided to store larger amounts of information than memory 1204, and in some instances, configured for long-term storage of information. In some embodiments, the storage device 1214 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 1206 are used to communicate with external devices and/or servers. The device 1200 may comprise multiple network interfaces 1206 to facilitate communication via multiple types of networks. Network interfaces 1206 may comprise network interface cards, such as Ethernet cards, optical transceivers, radio frequency transceivers, or any other type of device that can send and receive information. Non-limiting examples of network interfaces 1206 include radios compatible with several Wi-Fi standards, 3G, 4G, Long-Term Evolution (LTE), Bluetooth®, etc.

Power source 1208 provides power to device 1200. For example, device 1200 may be battery powered through rechargeable or non-rechargeable batteries utilizing nickel-cadmium or other suitable material. Power source 1208 may include a regulator for regulating power from the power grid in the case of a device plugged into a wall outlet, and in some devices, power source 1208 may utilize energy scavenging of ubiquitous radio frequency (RF) signals to provide power to device 1200.

Device 1200 may also be equipped with one or more output devices 1210. Output device 1210 is configured to provide output to a user using tactile, audio, and/or video information. Examples of output device 1210 may include a display (cathode ray tube (CRT) display, liquid crystal display (LCD) display, LCD/light emitting diode (LED) display, organic LED display, etc.), a sound card, a video graphics adapter card, speakers, magnetic, or any other type of device that may generate an output intelligible to a user.

Device 1200 is equipped with one or more input devices 1212. Input devices 1212 are configured to receive input from a user or the environment where device 1200 resides. In certain instances, input devices 1212 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for device 1200 are functionally and communicatively coupled to achieve certain behaviors. In some embodiments, these behaviors are controlled by software running on an operating system of device 1200.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate and intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for providing an enhanced authentication process with risk-based decision making for accessing protected services, the method comprising:
capturing attributes pertaining to a user and/or a user device;
determining a risk of data security based on the attributes pertaining to the user and/or the user device;
when the risk is unacceptable, requiring additional authentication for access to the protected services; and
when the risk is acceptable, granting access to the protected services without requiring additional authentication;
providing an access token to the user device upon the granting access to the protected services, wherein the access token expires after a predetermined period of time; and
determining an updated risk of data security prior to a time expiration of the access token,
wherein the capturing the attributes pertaining to the user and/or the user device comprises:
performing an authorization call to an application requesting access to the protected services;
gathering the attributes while accessing the application; and
bundling the attributes and the request to access the protected services into an authentication request object that is created by an authentication software development kit (SDK) residing in the application.

2. The method of claim 1, further comprising:
when the risk of data security is acceptable, refreshing access to the protected services without requiring additional authentication.

3. The method of claim 1, further comprising:
when the risk of data security is unacceptable, requiring the user to provide one or more of a password and biometric data.

4. The method of claim 1, further comprising determining an updated risk of data security after a time expiration of the access token.

5. The method of claim 1, further comprising:
storing the attributes pertaining to the user and/or user device at an authorization database configured to store unique attributes for a plurality of users and/or user devices.

6. The method of claim 1, wherein the attributes pertaining to the user and/or user device comprise one or more of: a cryptographic key, geographic location, time of day, day of week, device hygiene, a user usage pattern, a swipe pattern for touch sensitive displays, malware detection, jailbreak/root detection, debugger mode detection, location reading, accelerometer readings, gyroscope readings, compass readings, user device navigation patterns, application tamper detection, a user device identifier, user device hardware details, user device certificate, user device software details, an International Mobile Station Equipment Identifier (IMEI), a Personal Identification Number (PIN), a password, user biometric data, a device token, a Service Set Identifier (SSID), network proxy detection, device power state, and Virtual Private Network (VPN) detection.

7. A system for authorizing a user device for access to protected services based on risk-based decisions, the system comprising:
a resource server hosting an application that accesses the protected services;
a user device configured to communicate with the resource server to access the protected services;
an authentication server providing an authentication service for the application that accesses the protected services, the authentication server is configured for performing an authentication process, the authentication process comprising:
capturing attributes pertaining to a user of the user device and/or the user device;
determining a risk of data security based on the attributes pertaining to the user and/or the user device;
when the risk is unacceptable, requiring additional authentication for access to the protected services; and
when the risk is acceptable, granting access to the protected services without requiring additional authentication;
providing an access token to the user device upon the granting access to the protected services, wherein the access token expires after a predetermined period of time; and
determining an updated risk of data security prior to a time expiration of the access token,
wherein the capturing the attributes pertaining to the user of the user device and/or the user device comprises:
performing an authorization call to the application requesting access to the protected services;
gathering the attributes while accessing the application; and
bundling the attributes and the request to access the protected services into an authentication request object that is created by an authentication software development kit (SDK) residing in the application.

8. The system of claim 7, further comprising:
an authentication database configured to store the attributes captured by the authentication server.

9. The system of claim 7, wherein the authentication process further comprises:
when the risk of data security is acceptable, refreshing access to the protected services without requiring additional authentication.

10. The system of claim 7, wherein the authentication process further comprises:
when the risk of data security is unacceptable, requiring the user to provide one or more of a password and biometric data.

11. The system of claim 7, wherein the authentication process further comprises:
determining an updated risk of data security after a time expiration of the access token.

12. A non-transitory computer readable storage device for providing an enhanced authentication process with risk-based decision making for granting and maintaining access to an application that accesses protected services, the non-transitory computer readable storage device having computer executable instructions for performing steps comprising:
capturing attributes pertaining to a user and/or a user device;
determining a risk of data security based on the attributes pertaining to the user and/or the user device;

when the risk is unacceptable, requiring additional authentication for granting access to the protected services; and when the risk is acceptable, granting access to the protected services without requiring additional authentication;

providing an access token to the user device upon the granting access to the protected services, wherein the access token expires after a predetermined period of time; and determining an updated risk of data security prior to a time expiration of the access token, wherein the capturing the attributes pertaining to the user and/or the user device comprises:

performing an authorization call to an application requesting access to the protected services;

gathering the attributes while accessing the application; and bundling the attributes and the request to access the protected services into an authentication request object that is created by an authentication software development kit (SDK) residing in the application.

13. The non-transitory computer readable storage device of claim 12, further comprising computer executable instructions for:

when the risk of data security is acceptable, refreshing access to the protected services without requiring additional authentication.

14. The non-transitory computer readable storage device of claim 12, further comprising computer executable instructions for:

when the risk of data security is unacceptable, requiring the user to provide one or more of a password and biometric data.

15. The non-transitory computer readable storage device of claim 12, further comprising computer executable instructions for:

determining an updated risk of data security after a time expiration of the access token.

* * * * *